(12) United States Patent
Seki

(10) Patent No.: US 6,511,618 B1
(45) Date of Patent: Jan. 28, 2003

(54) CONTROL FOR OPERATING ACTUATORS IN AN INJECTION MOLDING MACHINE

(75) Inventor: Mitsunori Seki, Aichi-ken (JP)

(73) Assignee: Kabushiki Kaisha Meiki Seisakusho, Aichi-ken (JP)

( * ) Notice: Subject to any disclaimer, the term of this patent is extended or adjusted under 35 U.S.C. 154(b) by 0 days.

(21) Appl. No.: 09/413,748

(22) Filed: Oct. 6, 1999

(30) Foreign Application Priority Data

Jan. 29, 1999 (JP) .......................................... 11-020994

(51) Int. Cl.[7] .............................................. B29C 45/76
(52) U.S. Cl. .................... 264/40.1; 264/40.3; 264/40.6; 264/328.16; 264/335; 425/139; 425/143; 425/155; 425/160
(58) Field of Search ............................... 264/40.1, 40.3, 264/40.6, 328.14, 328.16, 334, 335; 425/155, 156, 160, 139, 143, 144, 556

(56) References Cited

U.S. PATENT DOCUMENTS

| | | | | |
|---|---|---|---|---|
| 4,772,196 A | * | 9/1988 | Asai | 425/155 |
| 4,961,884 A | * | 10/1990 | Watanabe et al. | 249/66.1 |
| 5,545,365 A | * | 8/1996 | Asai | 264/334 |
| 5,766,526 A | * | 6/1998 | Watanabe | 264/328.1 |
| 5,868,978 A | * | 2/1999 | Kadoriku et al. | 264/335 |
| 5,925,295 A | * | 7/1999 | Nakamura et al. | 264/40.1 |
| 6,190,585 B1 | * | 2/2001 | Brown et al. | 264/40.1 |
| 6,331,263 B1 | * | 12/2001 | Abe et al. | 264/257 |

FOREIGN PATENT DOCUMENTS

JP          1-108017          *  4/1989

* cited by examiner

Primary Examiner—Jill L. Heitbrink
(74) Attorney, Agent, or Firm—Browdy and Neimark

(57) ABSTRACT

A method for operating actuators, such as pneumatic valves, in an injection molding machine especially for CD or DVD discs, or other molded articles. The timing of auxiliary processes (such as blowing air into the mold cavity or applying suction to the molded article in the cavity) is set as a function of the instant of completion of a process in the main sequence of operations (especially, cooling the molded article prior to ejection from the mold). In a set and display section the user sets a preferred time $t_n$ for each actuator to operate after, or before, a set completion time T of the main-sequence process (e.g., cooling). The time $t_n$ can be negative or positive, so that the various actuators turn on before or after the set completion time. A CPU calculates a starting time $T \pm t_n$, and keeps the actuators on during a following interval $t_p$. The starting time $T \pm t_n$ may be input to a memory, and output to the respective actuator.

16 Claims, 4 Drawing Sheets

CONTROL FOR OPERATING ACTUATORS IN AN INJECTION MOLDING MACHINE

FIELD OF THE INVENTION

The present invention relates to control of actuators in injection molding machines and other machines for optical disc substrata like CD or DVD, and more particularly relates to timing control of air blowing for releasing molded discs from a mold cavity or of air suction for holding them on the mold cavity.

DESCRIPTION OF RELATED TECHNOLOGY

A conventional sequence of operations in an injection molding machine is shown in FIG. 4. Auxiliary sequences such as advancing a gate cutter, blowing air for releasing molded discs from a mold cavity, and applying air suction for holding the discs in the mold, are started in accordance with main sequence timing of processes like mold closing and clamping, injection, cooling, mold opening, and ejecting.

Each process time or interval in both the main and auxiliary sequences is counted by timers or delay timers provided for each main and auxiliary sequence program. In the cycle of injection molding for DVD shown in FIG. 4, a timer for the cooling process starts to count after the mold cavity has been filled in with melted resin and held with holding pressure to complete an injection process.

At an arbitrary (e.g., predetermined or selected) time between the start of the holding-pressure process and the time of cooling is completed, a center aperture of the disc is formed with a gate cuter which advances into the hole of a gate insert bushing. To facilitate release of the solidified disc from the cavity surface of a stationary mold-half of the mold, and from the stamper surface on the mold cavity of a movable mold-half, passages for blown air are provided in the cavity side and the stamper side, respectively. At least one passage is provided in the movable mold-half for air suction to maintain the released disc on the mold cavity when the mold is opened.

The timing for blowing air from the various passages has to be set in consideration of the progress of solidification during the cooling of the molded disc. The timing of releasing the molded discs from the surface of the mold cavity and the stamper has a big influence on the birefringence of the finished discs and the appearance of cloud on the molded discs. Additionally, it is important for shortening the molding cycle time that molded discs are released from the cavity. as soon as solidified sufficiently that the molded disc is durable enough to take the ejecting force.

In conventional methods, each delaying timer used for timing the blowing air to release a molded disc from the cavity, or to leave it held by suction on the movable mold-half side, starts its count at the start of the cooling process in the main sequence. As it is very difficult to find the optimum cooling conditions by only one test molding, frequent modification of the cooling time set for the main sequences is required, especially when modification of completion time of the cooling process is frequently required.

In the conventional method, modifying the setting of the completion time for the cooling process causes the time set for each of the air blowing and suction timers to be modified. This is because the time for these delaying timers corresponds only with, or is a function of, the starting time of the cooling process in the main sequence. This results in increased work for adjusting each of the delaying timers.

To avoid this problem, one might think that the delaying timers might be made to correspond with the completion time of the cooling process, instead of the starting time of the cooling process. But if it were no pressure for air blowing or any suction could be applied until the end of the cooling process, because of the way the delaying timers function.

However, the timing of the air-blowing pressure and suction which are applied to the molded discs, and the time from completion of the cooling process to the start of mold opening, are influenced by the size of the injection machine or mold, the molding conditions, and the mold construction, which need to be considered accordingly. Inevitably, the starting times for air blowing and suction must be chosen to occur both before and after the completion of the cooling process.

SUMMARY OF THE INVENTION

In light of the above-mentioned problems, it is an object of the present invention to provide a novel control of the actuators which are used for auxiliary sequence processes, in which the actuators can adapt themselves to a modification of the process times of the main sequence.

It is another object of the present invention to provide a novel control of air blowing or suction actuators used for releasing molded discs in auxiliary-sequence processes, wherein the starting times of the processes in the auxiliary sequences can adapt themselves to a modification of the time T set for completing the cooling process of a main sequence.

It is another object of the present invention to provide a novel control for air blowing or suction actuators used for releasing molded discs in processes of an auxiliary sequence, wherein the starting time $T \pm t_n$ of the nth process in the auxiliary sequence for releasing a molded disc is operated by a CPU, wherein T is the time set for completing the cooling process of a main sequence and $\pm t_n$ indicates the set time, before or after the completion of interval T, to be output to each time counter for operating the respective actuator or actuators.

For a better understanding of the operation, objects and advantages of the invention, reference should be had to the accompanying drawing and description in which there is illustrated and described a preferred embodiment of the invention.

BRIEF DESCRIPTION OF THE DRAWING FIGURES

The above and other objects and the nature and advantages of the present invention will become more apparent from the following detailed description of an embodiments taken in conjunction with drawing, wherein.

DETAILED DESCRIPTION OF THE PREFERRED EMBODIMENT

An embodiment of the present invention will be described in further detail by way of example with reference to the accompanying drawings.

Figure 2:
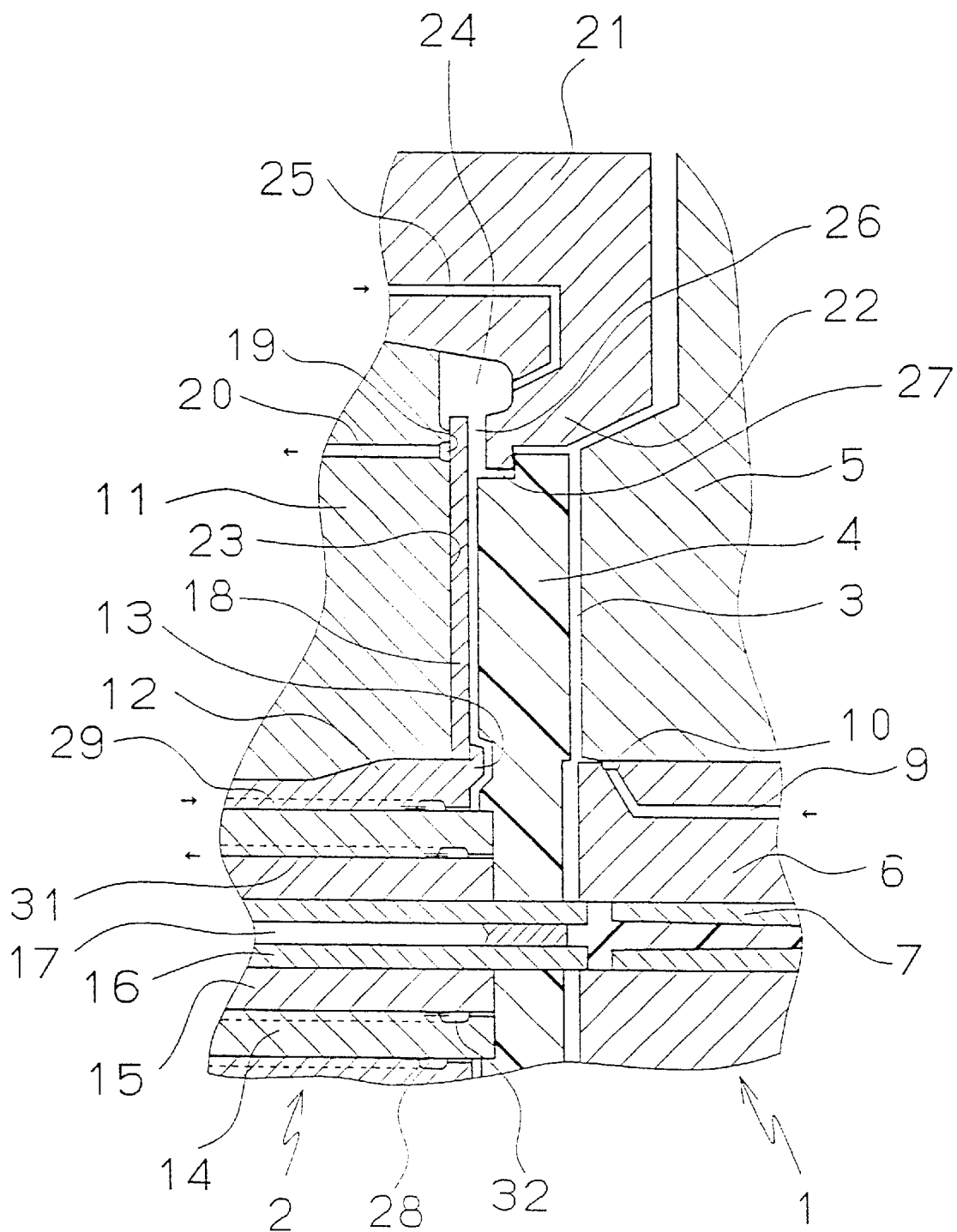
FIG. 2 is an elevational and partly cross sectional view of a mold.

FIG. 2 shows a movable mold-half 2 advanced near to a stationary mold half 1 so that a closed mold cavity 3 is formed. A disc 4 is shown in the cavity 3.

The stationary mold-half 1 includes a stationary mirror plate 5, through which a gate insert bushing 6 with a sprue bushing 7 is inserted at the center. A first air passage 9 leads to an annular channel 10 carved along the outer circumference of the gate insert bushing 6. It is provided in the gate insert bushing 6 so that compressed air may be blown through a clearance between the stationary mirror plate 5 and the outer periphery of the gate insert bushing 6 into the mold cavity 3.

The movable mold-half 2 includes a movable mirror plate 11 and a stamper 18. The stamper 18 has an outer peripheral portion which is held by an outer peripheral stamper holder 21. The stamper holder 21 has an L-shaped foot 22 with an annular protrusion 27, which maintains a gap 26. The inner peripheral portion of the stamper 18 is held by a nail 13 of an inner stamper holder 12. A stationary sleeve 14 is inside the stamper holder 12. A gate cutter 16 has a stationary sleeve 14 in which an ejector pin 17 and an ejector sleeve 15 are movably inserted.

A second air passage 20 for suction leads to an annular channel 19 which is provided in the movable mirror plate 11 so that the outer peripheral portion of the stamper 18 can be attracted to the surface 23 of the movable mirror plate 11. A third blowing-air passage 25, leading to an annular space 24, is provided in the outer peripheral stamper holder 21. A fourth blowing-air passage 29, leading to an annular channel 28, is provided in the inner stamper holder 12 so that air can be blown into the clearance between the surface of the stamper 18 and the molded disc 4. A fifth air passage 31 for suction, leading to an annular channel 32, is provided in the stationary sleeve 14 so that the molded disc can attracted onto the end surface of the stationary sleeve 14.

Figure 3:
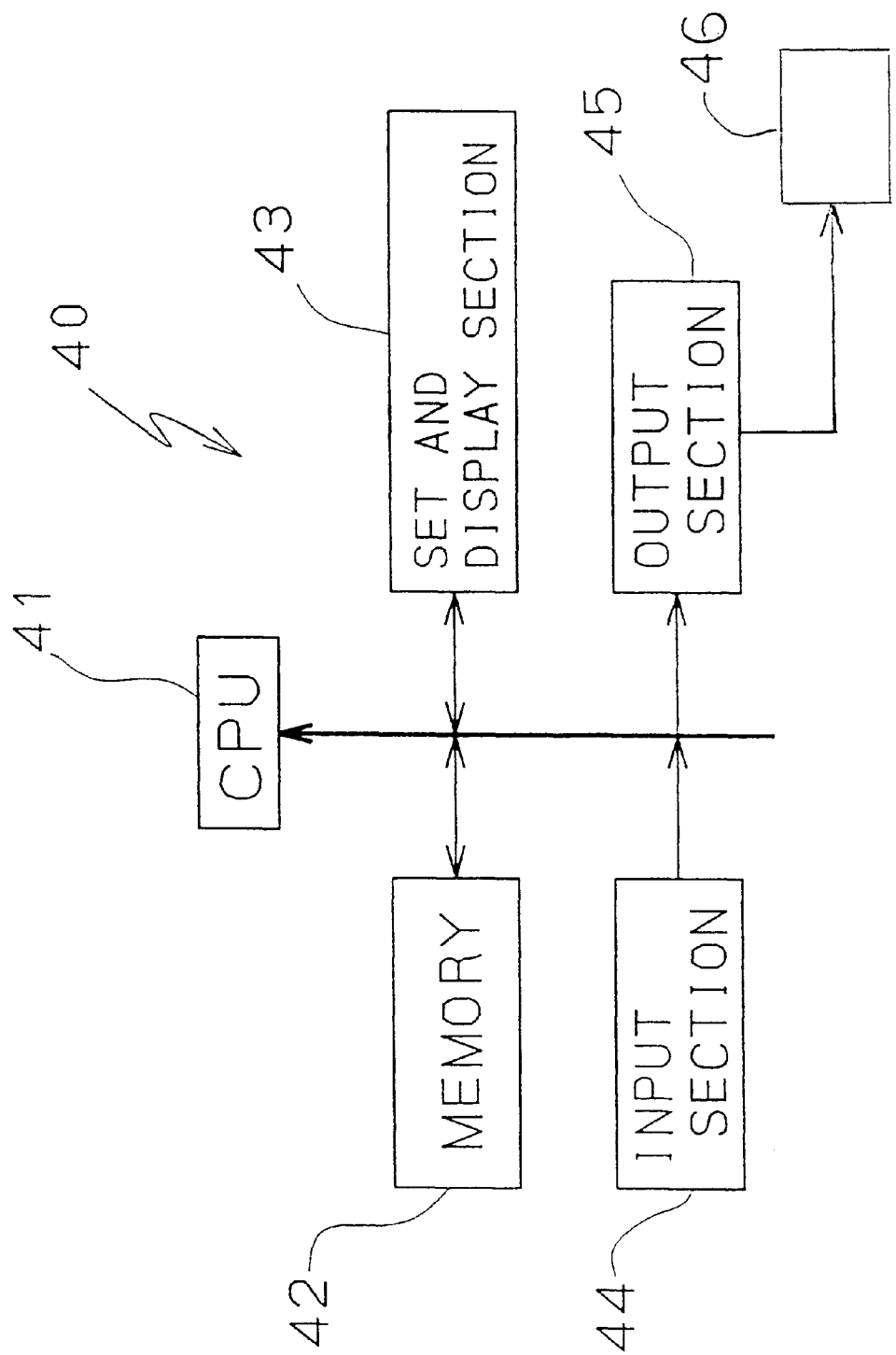
FIG. 3 is a block diagram of a process controller of the present invention.

FIG. 3 shows a controller 40 performing a main sequence control (for example, process control of injection rate, pressure and position, and temperature control of the heating barrel) and auxiliary sequence control (for such processes as controlling air for ejection, air blowing for releasing molded discs, or air suction). The control may be according to programs stored in memory 42. Set values like time, speed, pressure and temperature are input via a set and display section 43, and real values measured with sensors are displayed in the display section 43. Detected real values are input into an input section 44. Signals generated by CPU 41 are output from an output section 45 as command signals to operate the actuators.

Figure 1:
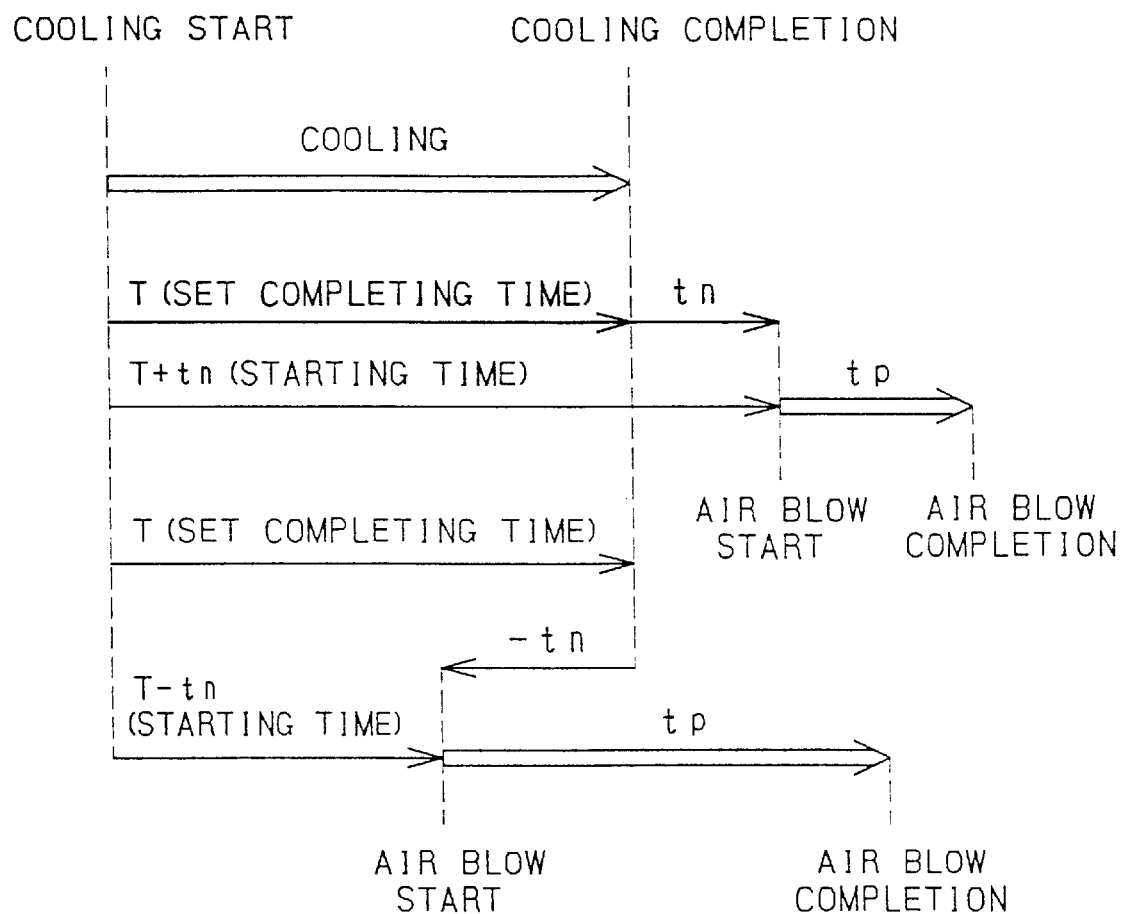
FIG. 1 is a time chart of air blowing or air suction processes depending on the set completion time of a cooling process in the present invention.

FIG. 1 shows a T (for example, a time set for completing a disc-cooling process) in a process of the main sequence 50, which is preferably preset in the set and display section 43. In an auxiliary sequence, each preferred process time $t_n$ or $-t_n$ (n designates a particular process), which is to be added to or to be subtracted from the set completion time T of the main sequence process 50, and each preferred set or preset time $t_p$ for continuing a process in the auxiliary sequence, are preferably stored in the memory 42 respectively. A required starting time $T \pm t_n$ for a process in the auxiliary sequence, is directed by CPU 41 to be stored in memory 42. When the starting time $T \pm t_n$ it reached, each time counter in CPU 41 outputs a command signal or signals to an actuator through output section 45 during time interval $t_p$. The CPU 41 preferably includes an internal clock, and the time counter may be embodied in software; it may also be any sort of timer or delay timer.

FIG. 3 shows, in schematic form, an actuator 46, which might be, for example, a solenoid-operated air valve.

Figure 4:
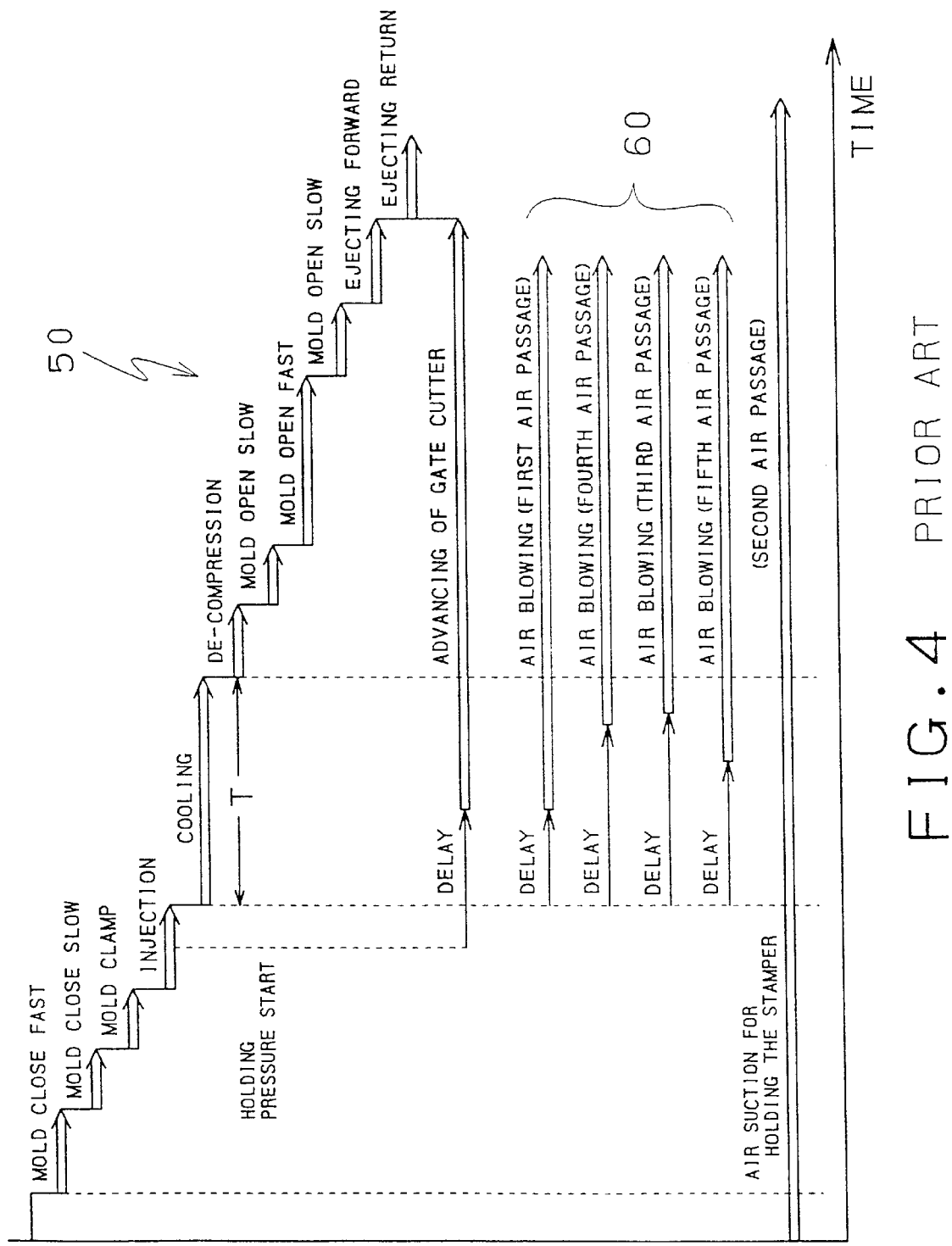
FIG. 4 is a time chart of injection molding process consisting of main sequence and auxiliary sequence in a conventional process.

In operation of the mold, the count of cooling time T is started in the controller 40 after melted resin has been injected into the cavity. The process sequences of air blowing and suction shown applied to the case of the conventional processes 60 of FIG. 4, but this is merely exemplary.

In preparation for releasing a molded disc, blowing of compressed air is started through first air passage 9 in the stationary mold-half side 1 at time $-t_1$ before the set end of cooling time T, that is, at the time $T-t_1$. Then, air blowing is started through third air passage 25 and fourth air passage 29 in the movable mold-half 2 at the times $T-t_3$ and $T-t_4$ respectively. Then the mold is opened, but the molded disc does not fall since it has been attracted to the movable mold-half 2 by air suction through fifth air passage 31, from time $T-t_5$. When the mold is opened and after each process in the auxiliary sequence 60 is over, the molded disc is ejected by advancing of the ejector sleeve 15, and removed.

In disc injection molding it is very difficult to find the optimum cooling time T by only one molding trial, and, it is often necessary to change the set cooling time halfway through production. Consequently, although a change of the cooling time T is frequently required, the starting time $T \pm t_n$ of air blowing or suction in each air passage can be made to correspond with the modification of cooling time T, resulting in facilitating adjustment of the timing of air blowing or suction.

As mentioned above, the present invention includes a novel control method of an injection molding machine capable of setting a starting time of a process in auxiliary sequences in correspondence with the timing of a process in a main sequence, which facilitates adjustment despite modification of a process in the main sequence.

The foregoing description of the specific embodiments will so fully reveal the general nature of the invention that others can, by applying current knowledge, readily modify and/or adapt for various application such embodiments without undue experimentation and without departing from the generic concept, and therefor, such applications and modifications should be and are intended to comprehended within the meaning and range of equivalents of the disclosed embodiments. The meaning and materials for carrying out various disclosed function may take a variety of alternative forms without the invention. It is to be understood that the phraseology or terminology employed herein is for the purpose of description and not of limitation.

What is claimed is:

1. A control method for operation of an actuator in an injection molding machine having a mold cavity, where the injection molding machine performs processes in a main sequence and at least one auxiliary sequence, the method comprising:
    setting a starting time of an auxiliary process of the auxiliary sequence at a predetermined time $-t_n$ before the end of a set process time T of a selected process in the main sequence;
    starting operation of an actuator for performing the auxiliary process at the starting time;
    changing the set process time T of said selected process;
    setting a new starting time of the auxiliary process of the auxiliary sequence at said predetermined time $-t_n$ before the end of the changed set process time T; and
    starting operation of said actuator for performing said auxiliary process at the new starting time.

2. The control method according to claim 1, wherein the step of setting a starting time includes using a time counter to determine the starting time from the end of the set process time.

3. The control method according to claim 2, wherein the step of starting operation of the actuator further comprises sending a command signal from the time counter to the actuator.

4. The control method according to claim 1, wherein the auxiliary process comprises applying air pressure in the mold cavity of the injection molding machine.

5. The control method according to claim 1, wherein the set process time T of the selected process in the main sequence comprises a disc-cooling time.

6. The control method according to claim 5, wherein the auxiliary process comprises applying air pressure in the mold cavity of the injection molding machine.

7. A control method for operation of actuators in an injection molding machine, where the injection molding machine performs processes in a main sequence and at least one auxiliary sequence; the method comprising:

setting a set process time T of a process in the main sequence;

setting, in a set and display section, a preferred time $-t_n$ for starting operation of one of the actuators before the end of the set process time T;

calculating a starting time $T-t_n$;

inputting the starting time $T-t_n$ to a memory;

outputting the starting time $T-t_n$ to a respective time counter to operate a respective one of the actuators;

changing the set process time T;

calculating a new starting time $T-t_n$ based on the changed process time T;

inputting the a new starting time $T-t_n$ to a memory; and outputting the new starting time $T-t_n$ to the respective time counter to operate a respective one of the actuators.

8. The method according to claim 7, wherein the actuators actuate blowing air or air suction.

9. The method according to claim 7, wherein the process in the main sequence is a cooling process.

10. The method according to claim 7, wherein the step of calculating is performed with a CPU.

11. A control method for operation of an actuator in an injection molding machine having a mold cavity, where the injection molding machine performs processes in a main sequence and at least one auxiliary sequence, the method comprising:

setting a starting time of an auxiliary process of the auxiliary sequence at a predetermined time $-t_n$ before the end of a set process time T of a selected process in the main sequence;

starting operation of an actuator for performing the auxiliary process at the starting time;

changing the set process time T of said cooling process to establish a new starting time of the auxiliary process of the auxiliary sequence at said predetermined time $-t_n$ before the changed set process time T; and starting operation of said actuator for performing said auxiliary process at the new starting time.

12. The method of claim 11 wherein the selected process is a cooling process.

13. A control method for operation of actuators in an injection molding machine, where the injection molding machine performs processes in a main sequence and at least one auxiliary sequence; the method comprising:

setting a set process time T of a process in the main sequence;

setting, in a set and display section, a preferred time $-t_n$ for starting operation of one of the actuators before the end of the set process time T;

calculating a starting time $T-t_n$;

inputting the starting time $T-t_n$ to a memory;

outputting the starting time $T-t_n$ to a respective time counter to operate a respective one of the actuators;

changing the set process time T to establish a new starting time $T-t_n$;

inputting the new starting time $T-t_n$ to a memory; and outputting the new starting time $T-t_n$ to the respective time counter to operate the respective one of the actuators.

14. The method of claim 13 wherein the selected process is a cooling process.

15. A control apparatus for controlling an actuator of an injection molding machine, where the injection molding machine performs processes in a main sequence and at least one auxiliary sequence, said apparatus comprising:

a set and display section for setting a set process time T of a selected process in the main sequence and a predetermined time $-t_n$ before the end of the set process time;

a CPU connected to said set and display section for calculating the starting time of an auxiliary process of the auxiliary sequence as the difference $T-t_n$ between the end of the set process time and the predetermined time;

a memory connected to said CPU to store the set process time T, the predetermined time $-t_n$ and the starting time; and an output section coupled to said memory for starting the actuator at the starting time, wherein the set process time is changeable and said CPU is controlled to: change the set process time T to establish a new starting time $T-t_n$; input the new starting time $T-t_n$ to the memory; and control the actuator to start at the new starting time.

16. The apparatus of claim 15 wherein the selected process is a cooling process.

* * * * *